United States Patent
Narayan

(10) Patent No.: US 12,045,151 B2
(45) Date of Patent: Jul. 23, 2024

(54) GRAPH-BASED IMPACT ANALYSIS OF MISCONFIGURED OR COMPROMISED CLOUD RESOURCES

(71) Applicant: Palo Alto Networks, Inc., Santa Clara, CA (US)

(72) Inventor: Krishnan Shankar Narayan, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 191 days.

(21) Appl. No.: 17/444,729

(22) Filed: Aug. 9, 2021

(65) Prior Publication Data

US 2023/0040635 A1 Feb. 9, 2023

(51) Int. Cl.
*G06F 16/00* (2019.01)
*G06F 11/30* (2006.01)
*G06F 16/901* (2019.01)
*G06F 16/903* (2019.01)

(52) U.S. Cl.
CPC ...... *G06F 11/3051* (2013.01); *G06F 16/9024* (2019.01); *G06F 16/90335* (2019.01)

(58) Field of Classification Search
CPC .................. G06F 16/90335; G06F 16/9024
USPC ....................................................... 707/798
See application file for complete search history.

(56) References Cited

U.S. PATENT DOCUMENTS

| | | | | |
|---|---|---|---|---|
| 10,528,897 B2* | 1/2020 | Labat | ............ | G06Q 10/06 |
| 2012/0311523 A1* | 12/2012 | Venkataraman | ...... | G06F 16/284 717/104 |
| 2020/0382560 A1* | 12/2020 | Woolward | ............ | H04L 63/205 |

OTHER PUBLICATIONS

"PageRank centrality for temporal networks"; By: Laishui Lv; Published 2019 https://pdf.sciencedirectassets.com/271541/1-s2.0-S0375960119X00080/1-s2.0-S0375960119300611/main.pdf?X-Amz-Security-Token=IQoJb3JpZ2luX2VjEMP%2F%2F%2F%2F%2F%2F%2F%2F%2FwEaCXVzLWVhc3QtMSJHMEUCIByv91O KvTOBVvbGg2uK9Dqbvzk3pUIYrHLu8sfyg1SQ.*
Hyder, "A Beautiful Visualization of Your AWS Infrastructure", Botmetric, Apr. 4, 2016, 5 pages, retrieved on Jul. 14, 2021 from https://www.botmetric.com/blog/aws-vpc-resource-relationship-view/.
Hyder, "Botmetric Cloud Explorer: A Handy Topological Relationship View of AWS Resources", Botmetric, Apr. 11, 2017, 5 pages, retrieved on Jul. 14, 2021 from https://www.botmetric.com/blog/relationship-view-aws-resources-potmetric-cloud-explorer/.

* cited by examiner

*Primary Examiner* — Chelcie L Daye
(74) *Attorney, Agent, or Firm* — Gilliam IP PLLC

(57) ABSTRACT

A graph representation of cloud resources and their relationships is generated and maintained to provide insights into impact of incidents affecting cloud resources on others in the cloud environment. Cloud resource data for the cloud resources are obtained and relationships among the cloud resources are determined. Relationships among the cloud resources are determined based on analysis of configuration data associated with the cloud resources from which relationships among cloud resources of different types can be inferred, and external sources may also be utilized to facilitate identification of relationships. A graph representation of the cloud resources and their determined relationships is built where the cloud resource data are stored in vertices with directed edges between the vertices representing the identified relationships. The graph can be analyzed based on various graph algorithms to analyze impact of misconfigured or compromised resources to identify related cloud resources that are or would be affected.

20 Claims, 10 Drawing Sheets

GRAPH-BASED IMPACT ANALYSIS OF MISCONFIGURED OR COMPROMISED CLOUD RESOURCES

BACKGROUND

The disclosure generally relates to data processing and to information retrieval and database structures therefor.

Cloud service providers (CSPs) offer resources which are available to or can be provisioned by customers of the CSP. Data describing such cloud resources can be accessed via an application programming interface(s) (API(s)) provided by the CSP. For instance, data/metadata of cloud resources may be represented with JavaScript Object Notation (JSON) or other structured data formats. Cloud resource data often indicate types and properties of the corresponding cloud resources, configuration details about the cloud resources, and/or relationships with other types of cloud resources. Configuration checks or verification operations can be performed to identify misconfigurations of specific cloud resources which may contribute to compromises of misconfigured resources. Examples of configuration checks which can be performed include checks for cloud infrastructure configuration based on Center for Internet Security benchmarks and Payment Card Industry (PCI) compliance checks for data stored in cloud object storage (e.g., storage buckets).

BRIEF DESCRIPTION OF THE DRAWINGS

Embodiments of the disclosure may be better understood by referencing the accompanying drawings.

DESCRIPTION

Figure 1:
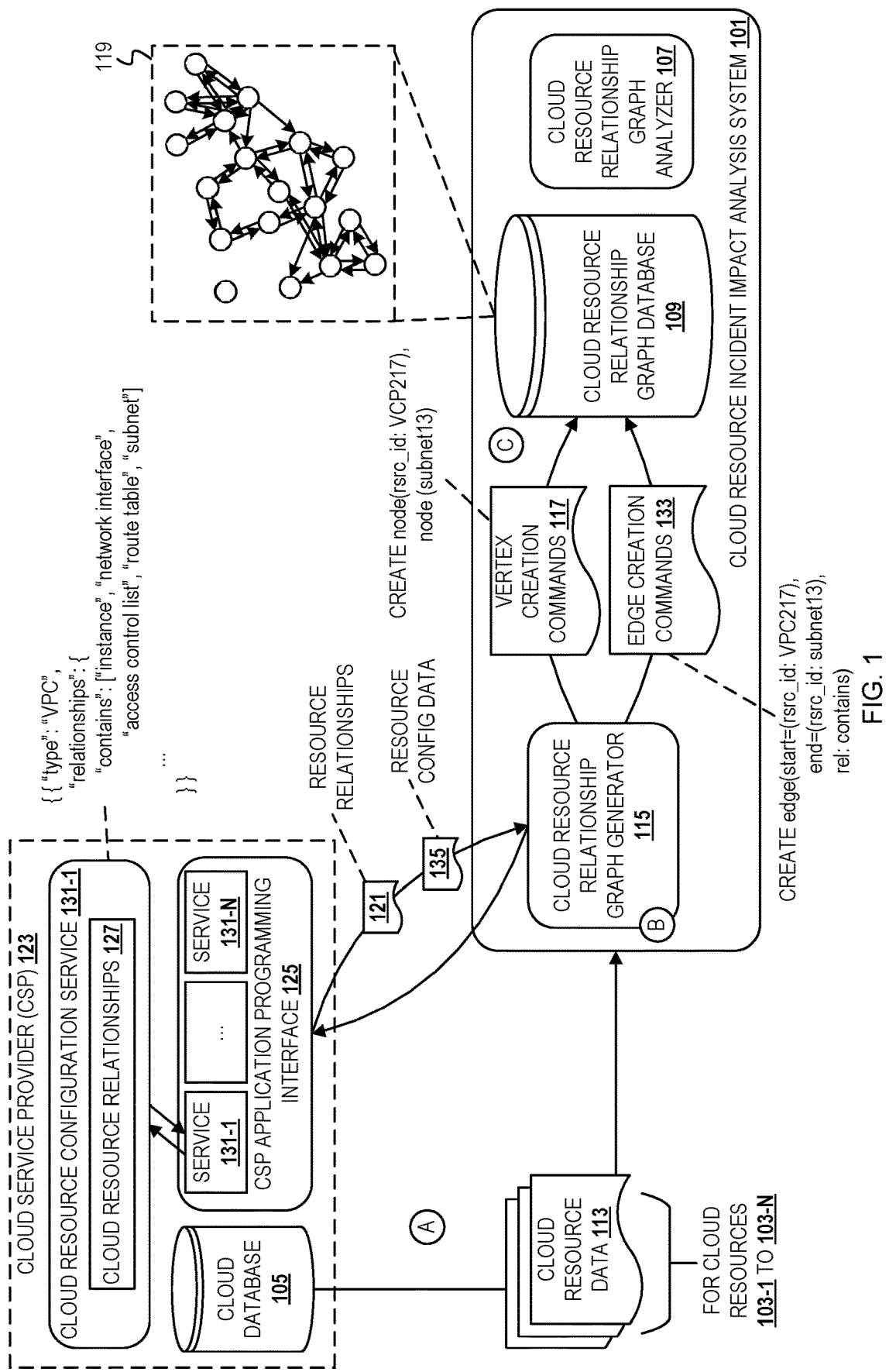
FIG. 1 depicts a conceptual diagram of building a graph representation of relationships among cloud resources within a cloud environment.

The description that follows includes example systems, methods, techniques, and program flows that embody aspects of the disclosure. However, it is understood that this disclosure may be practiced without these specific details. For instance, this disclosure refers to streaming events corresponding to cloud resource creations, updates, and deletions logged by a logging service of a CSP as part of building and maintaining a graph database in illustrative examples. Aspects of this disclosure can be also applied to other data streaming techniques supported by the CSP by which events identifying cloud resources are communicated between entities. In other instances, well-known instruction instances, protocols, structures and techniques have not been shown in detail in order not to obfuscate the description.

Overview

While many security vendors provide services for checking configurations of cloud resources of different types and identifying misconfigured or compromised cloud resources, checks are limited to individual cloud resource types. For instance, while a misconfiguration for a role indicating permissions for accessing a data storage instance (e.g., a storage bucket) will have security implications for the data storage instance as much as—if not more than—for the role itself, checks for misconfigurations will identify the misconfigured role without indicating the impact it may have had on the data storage instance. Performing misconfiguration impact analysis based on generation of a graph representation of relationships among cloud resources as described herein resolves this shortcoming by allowing for discovery of cloud resources within the "blast radius" for a misconfigured or compromised cloud resource to enhance security analysis and remediation of misconfigured or compromised cloud resources.

A system obtains and analyzes cloud resource data for cloud resources associated with a cloud account and determines relationships among the cloud resources. The system can determine relationships among the cloud resources based on obtaining configuration data for cloud resources of different types from the CSP and "tracing" relationships between cloud resources represented by the cloud resource data based on analysis of the configuration data. Alternatively, or in addition, a service offered by the CSP or another external service which provides for identification of cloud resources associated with a cloud account and their relationships can be utilized. The system builds a graph representation of the cloud resources and their determined relationships, or a "relationship graph." For instance, a graph database can be generated where the cloud resource data are stored in vertices with directed edges between the vertices representing the determined relationships. The relationship graph can be updated as cloud resources represented therein are modified (e.g., created, deleted, etc.) and the relationships change so that the relationship graph is current. Once the relationship graph is built, the system analyzes the relationship graph based on various graph algorithms to analyze impact of misconfigured or compromised resources to identify related cloud resources that are or would be affected by the misconfigurations or compromises that may otherwise go unidentified as impacted with point checks of cloud resources. Utilizing graph analytics for analysis of related cloud resources provides visibility into the impact that a misconfiguration or compromise of one cloud resource would have on the cloud resources to which it is related— whether immediately or by being closely related to the misconfigured resource.

Although any graph algorithm supported by the graph analytics component of the system can be implemented for misconfiguration impact analysis, several applications of graph analytics for analysis of a relationship graph are described in additional detail herein: PageRank centrality, identification of strongly connected components (SCCs), and betweenness centrality. By executing a PageRank analysis on the relationship graph, the most critical cloud resource(s) in the cloud environment can be identified based on the corresponding vertex(es) having the greatest number of edges to and from other vertices. Misconfigurations and compromises of these cloud resources can be identified as having the greatest impact on the cloud environment with respect to the cloud resources which may also be affected and can be flagged as most critical for investigation and remediation. SCCs with respect to the relationship graph indicate groups of cloud resources which are tightly connected, such as a route table, subnet(s), and access control list. If a cloud resource corresponding to a vertex which belongs to a subgraph of SCCs is misconfigured or compromised, then it can be determined that the other cloud resources within the SCC should be evaluated for remediation due to reliance of the cloud resources on each other. Betweenness centrality facilitates identification of "bridges" between different clusters of cloud resources. Cloud resources corresponding to vertices having a greater number of shortest paths passing through the vertex often are the bridge between different clusters and can be identified as potential areas for or the cause of bottlenecks and which may impact multiple groups of cloud resources if misconfigured or compromised. Also, cloud resources corresponding to vertices having a lower number of shortest paths passing through the vertex may be identified as having fewer relationships with other cloud resources and thus may be incurring cost without having substantial impact within the cloud environment.

Example Illustrations

FIG. 1 depicts a conceptual diagram of building a graph representation of relationships among cloud resources within a cloud environment. A CSP 123 maintains a cloud database 105 in which data and metadata representing cloud resources, or "cloud resource data," are stored. The cloud database 105 can be a cloud database provided as a software-as-a-service cloud database which is external to the cloud environment. Cloud resource data maintained in the cloud database 112 can thus correspond to cloud resources across a wide variety of servers, locations, etc. and may be associated with different services offered by the CSP 123. The cloud database 105 may serve a single cloud account or multiple cloud accounts associated with the CSP (i.e., in the cases of single tenancy and multi-tenancy, respectively). The CSP 123 provides an application programming interface (API) 125 for interfacing with various services offered by the CSP 123, the cloud database 105, etc. In this example, the API 125 comprises APIs for services 131A-1 to 131-N of the CSP 123.

FIG. 1 also depicts a cloud resource incident impact analysis system ("system") 101. The system 101 builds and analyzes graph representations of cloud resources provisioned/utilized in association with a cloud account and their relationships to provide insights into impact of misconfiguration or compromises of cloud resources on other cloud resources based on relationships indicated in their configurations. The system 101 includes a cloud resource relationship graph generator ("graph generator") 115 and a cloud resource relationship graph analyzer ("graph analyzer") 107. The graph generator 115 determines relationships among cloud resources for which cloud resource data are obtained and generates/maintains a graph database storing a graph representation of the cloud resources and determined relationships. The graph analyzer 107 facilitates analyzing impact of misconfigured cloud resources based on the generated relationship graph. The operations of the graph generator 115 are described in reference to FIG. 1, while the operations of the graph analyzer 107 are described in reference to FIG. 2.

FIG. 1 is annotated with a series of letters A-C. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

At stage A, the system 101 obtains cloud resource data 113 for cloud resources associated with a cloud account from the cloud database 105. The cloud resource data 113 comprises data/metadata of cloud resources 103-1 to 103-N, where the cloud resources 103-1 to 103-N are the N cloud resources currently associated with the cloud account. The system 101 obtains the cloud resource data 113 based on calling one or more functions of the API 125. The called functions of the API 125 may be functions of the APIs exposed by one or more of the services 131-1 to 131-N of the CSP 123. The system 101 may obtain the cloud resource data 113 as part of onboarding a cloud account to a security platform which offers the system 101.

At stage B, the graph generator 115 determines relationships among the cloud resources 103-1 to 103-N for which the cloud resource data 113 have been obtained. The graph generator 115 can determine the relationships based on one or more of several techniques: utilizing a service offered by the CSP 123, utilizing functionality of an open source library/package which facilitates tracing of relationships among a set of cloud resources, and/or determining relationships locally. Which of these techniques the graph generator 115 uses can depend on the identity of the CSP 123, as some CSPs may not offer a service which supports identification of cloud resources and their relationships. In this example, a first of the services 131-1 to 131-N, or a cloud resource configuration service ("configuration service") 131-1, determines at least a subset of the cloud resources associated with a cloud account and relationships among the cloud resources based on cloud resource relationship data ("relationship data") 127 that the CSP 123 maintains. The graph generator 115 can issue at least a first request identifying the cloud account to the service 131-1 via the API exposed by the service to determine relationships among cloud resources of the supported types used by the cloud account.

The service 131-1 determines relationships among resources which can be identified for the cloud account and communicates an indication of relationships 121 which were identified to the graph generator 115. The relationships 121 can comprise identifiers associated with those of the cloud resources 103-1 to 103-N of the types supported by the service 131-1 and the corresponding relationships between the cloud resources. As an example, the relationship data 127 depicted in FIG. 1 includes an example relationship associated with virtual private clouds (VPC), in which VPCs have a "contains" relationship for network interfaces, instances, access control lists, route tables, and subnets. The relationships 121 will identify those of the cloud resources 103-1 to 103-N having a type of "VPC" and those of types "instance," "network interface," etc. associated by the "contains" relationship indicated in the relationship data 127.

The graph generator 115 obtains the relationships 121 and determines whether any of the cloud resources 103-1 to 103-N were not of types supported by the service 131-1 and thus are not reflected in the relationships 121. The graph generator 115 may have been configured with indications of resource types which are unsupported by the service 131-1 so that the ones of the cloud resources 103-1 to 103-N not reflected in the resource relationships can be determined. In some implementations, the graph generator 115 can utilize an open source library/package which facilitates determination of relationships among resources for the remaining ones of the cloud resources 103-1 to 103-N and the corresponding ones of the cloud resource data 113. Alternatively, or in addition, the graph generator 115 can obtain resource configuration data 135 from the CSP 123 for the cloud resources not supported by the service 131-1 and determine the relationships among the resources based on analysis of the resource configuration data 135. The resource configuration data 135 may be data represented with JSON which specifies configuration of cloud resources of the types supported by the CSP 123, including relationships between cloud resources of different types. For instance, a first of the resource configuration data 135 may specify configuration for VPC resources, a second of the resource configuration data 135 may specify a configuration of network interface resources, etc., and each of the resource configuration data reflect relationships among the cloud resource types that are also indicated in the relationship data 127. The graph generator 115 can obtain the resource configuration data 135 by calling one or more functions of the API 125, such as functions of the service API(s) associated with the remaining cloud resources. Once the resource configuration data 135 have been obtained, the graph generator 115 can determine remaining relationships among the cloud resources 103-1 to 103-N based on relationships indicated in the resource configuration data 135.

At stage C, the graph generator 115 builds a graph database 109 which stores a graph representation of the relationships 121. The graph generator 115 generates and submits vertex creation commands 117 and edge creation commands 133 to the graph database 109 for creation of vertices representing the cloud resources 103-1 to 103-N and edges representing the relationships 121. The vertex creation commands 117 specify creation of vertices in the graph database 109 which identify one of the cloud resources 103-1 to 103-N and store corresponding ones of the cloud resource data 113. The vertex creation commands 117 may also indicate labels, tags, etc. to be applied to vertices which indicate additional information about the corresponding cloud resources which the graph generator 115 determines from the cloud resource data (e.g., with specified keys used in the cloud resource data), such as region, department of the associated organization, etc. The edge creation commands 133 specify creation of directed edges between two vertices representing cloud resources between which a relationship was identified. The graph generator 115 may generate and submit the vertex creation commands 117 upon obtaining the cloud resource data 113 to create vertices in the graph database 109 representing each of the cloud resources 103-1 to 103-N and subsequently generate and submit the edge creation commands 133 as or after the relationships 121 among resources are identified.

As an example, the relationships 121 may comprise an indication of a VPC with an identifier of VPC217 which has a "contains" relationship with a subnet with an identifier of subnet13. A first of the vertex creation commands 117 thus indicates creation of vertices for storage of cloud resource data for each of these resources. A first of the edge creation commands 133 indicates creation of a directed edge which starts at the vertex storing the data for VPC217 and ends at the vertex storing the data for subnet13. The graph generator 115 may add a label, property value, etc. to each of the directed edges created with the edge creation commands 133 to identify the associated relationship or may use a generic indicator of relationships for simplicity (e.g., configuration_link).

To determine remaining relationships involving cloud resources of types which are not supported by the service 131-1, the graph generator 115 utilizes the indications of relationships included in the resource configuration data 135 associated with cloud resources of the remaining types. The graph generator 115 determines identifiers of cloud resources corresponding to the types for which corresponding ones of the resource configuration data 135 have been obtained and "traces" relationships among the cloud resources represented in the cloud resource data 113 based on cloud resource types indicated in the resource configuration data 135. For each of the cloud resource types, the graph generator 115 can determine the cloud resources corresponding to vertices which indicate that resource type, determine the related types of cloud resources specified in a relationship included in the resource configuration data 135, and determine the cloud resources corresponding to vertices which indicate the related types. The types may be stored as a property, key/value pair, etc. in vertices of the graph database 109. As these relationships between cloud resources among different types represented with vertices are determined, the graph generator generates corresponding ones of the edge creation commands 133 for creation of directed edges between vertices identifying the types which were determined to be related from the resource configuration data 135. Start and end vertices for the directed edges can be determined based on known structure of the resource configuration data 135 (e.g., known JSON key/value pairs indicating start/from and to/end cloud resources) and/or based on heuristics from which the direction of the relationship to be reflected in the directed edge can be inferred. The graph generator 115 can generate corresponding ones of the edge creation commands 133 and submit the commands to the graph database 109 as the relationships are determined from the resource configuration data 135.

As a result of creation of vertices and edges in the graph database 109 through generation and submission of the vertex creation commands 117 and edge creation commands 133, a relationship graph 119 results. The relationship graph 119 may comport to the property graph model for graph databases. In the relationship graph 119 by which data are stored in the graph database 109, each of the vertices of the relationship graph 119 identifies a corresponding one of the cloud resources 103-1 to 103-N and stores the associated data of the cloud resource data 113. Each of the edges of the relationship graph 119 connect the vertices based on the relationships 121 identified among the cloud resources 103-1 to 103-N. While FIG. 1 depicts the example relationship graph 119 for clarity, relationship graphs may be several orders of magnitude larger than that which is depicted. For instance, a relationship graph built for a cloud environment associated with a cloud account which uses thousands of cloud resources will have a corresponding number of vertices (i.e., thousands of vertices).

In some implementations, a data stream can be established to which one or more services of the CSP 123 (e.g., a logging service) publish cloud resource data as updates are made to the cloud environment, such as creation of new/ additional resources, updating existing resources, or deletion of resources. In these cases, the CSP 123 can provide an event streaming service which is configurable to treat addition of new cloud resource data to the cloud database 105 as events which are published to the data stream by which events are streamed to subscribers. The system 101 subscribes to this data stream and receives cloud resource data as they are published by the logging service, which facilitates periodic updates to the graph to maintain the graph database 109. For instance, after initially building the graph database 109, as new events indicating resource creations/deletions/updates are published to the data stream, the system 101 obtains the indication of the event and any associated cloud resource data.

In the case of cloud resource creation or update events, the graph generator 115 determines any relationships between the cloud resource identified in the event data and the cloud resources 103-1 to 103-N represented with the cloud resource data 113 using one or more of the relationship determination techniques described above. Once the relationships have been determined, the graph generator 115 generates and submits a command for insertion of a new vertex which stores data of the new cloud resource and identifies the new cloud resource or a command for updating an existing cloud resource for which relationships may have changed. The graph generator 115 also generates and submits an additional command(s) for insertion of one or more edges corresponding to the determined relationships between the new/updated cloud resource and the existing cloud resources represented in the graph database 109. In the case of cloud resource deletion events, the graph generator 115 generates and submits a command to the graph database 109 to delete the vertex corresponding to the deleted cloud resource, which removes the indication of the cloud resource from the graph database 109 and any relationships in which the deleted cloud resource was identified.

Figure 2:
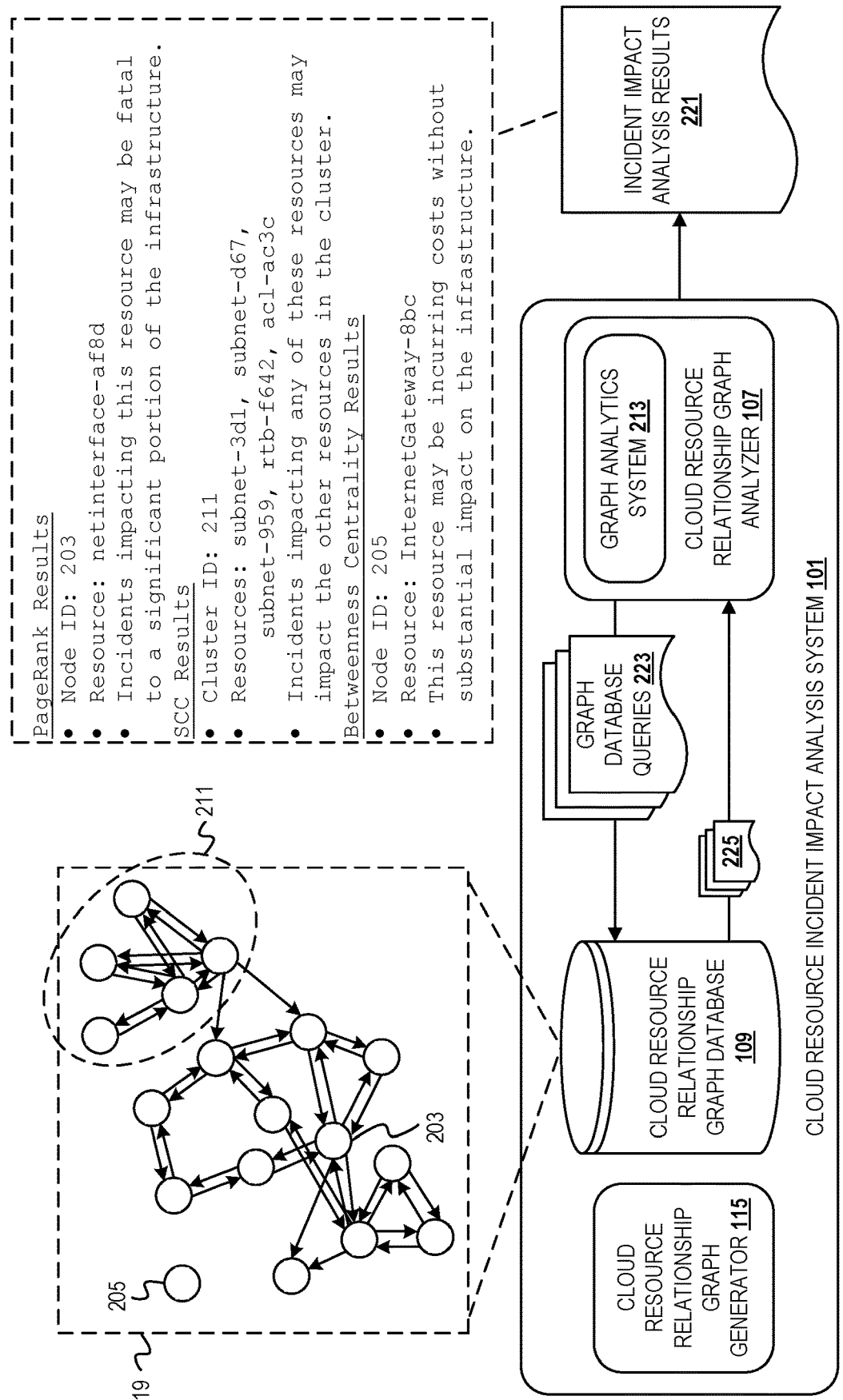
FIG. 2 depicts a conceptual diagram of utilizing a cloud resource relationship graph to analyze impact of incidents affecting cloud resources on other cloud resources in a cloud environment.

FIG. 2 depicts a conceptual diagram of utilizing a cloud resource relationship graph to analyze impact of incidents (i.e., misconfigurations and/or compromises) affecting cloud resources on other cloud resources in a cloud environment. FIG. 2 depicts the system 101 and graph database 109 of FIG. 1, where the relationship graph 119 comprising vertices representing cloud resources and edges representing relationships is stored in the graph database 109. The graph analyzer 107 includes a graph analytics system 213. The graph analytics system 213 provides analytics services for the graph database 109. The graph analytics system 213 may be implemented locally or may be an open source library/package utilized by the graph analyzer 107.

The graph analytics system 213 submits graph database queries 223 to the graph database 109 and obtains results 225. The graph database queries 223 may be queries submitted via a user interface such that the graph analyzer 107 provides an interface for the graph database 109. Alternatively, or in addition, the graph database queries 223 may have been previously written and cached for submission to the graph database 109 as part of incident impact analysis performed for a cloud environment once the graph database 109 has been updated. Each of the graph database queries 223 indicate a graph algorithm which the graph analytics system 213 implements for analysis of data stored in the graph database 109. The graph database queries 223 may also indicate one or more labels/tags by which vertices of the relationship graph 119 have been labelled or tagged to facilitate more complex analysis of the graph representation, such as labels or tags indicating region associated with the cloud resource, department/division of the associated organization, etc. Examples of graph algorithms and analyses which may be indicated in the graph database queries 223 and their applications for incident impact analysis in a cloud environment are described below:

TABLE 1

Graph Algorithms and Use Cases

| Graph Algorithm/ Analysis | Application to Incident Impact Analysis |
|---|---|
| Single-Source Shortest Path | Identifies cloud resources that are impacted immediately by misconfiguration/compromise of a related cloud resource |
| All-Pairs Shortest Path | Identifies alternate paths by which a cloud resource can be connected/related to a misconfigured or compromised cloud resource |
| PageRank Centrality | Identifies resource(s) which would have the greatest impact on cloud environment if misconfigured or compromised |
| Degree Centrality | Used for risk analysis for a cloud resource based on its usage |
| Closeness Centrality | Indicates "blast radius" impact of a misconfiguration or compromise and identifies the cloud resource which should be most protected |
| Betweenness Centrality | Highlights bottlenecks and identifies potential "weakest links" in the cloud environment |
| Strongly Connected Components | Identifies cloud resources which are closely related |

While the graph analytics system 213 may implement any of the above graph algorithms for analyzing cloud resource relationship graphs and are not limited to these graph algorithms, PageRank centrality, strongly connected components (SCC), and betweenness centrality are described with additional detail herein. These graph algorithms and example results as applied to the graph database 109 for incident impact analysis are represented in an incident impact analysis results ("results") 221 which the graph analyzer 107 generates based on the results 225 of the graph database queries 223. The results 221 at least identify the cloud resources determined to be most critical to the cloud environment in terms of having substantial impact on other cloud resources, where "substantial impact" can vary depending on the associated graph algorithm.

A first of the graph database queries 223 in this example indicates for the graph analytics system 213 to perform PageRank analysis of the relationship graph 119. As indicated in Table 1, when the conventional implementation of the algorithm is applied to a directed graph representing cloud resources and their relationships, PageRank facilitates identification of the most important cloud resources in the graph. Important cloud resources can also be considered those which would have the greatest impact on the rest of the cloud environment if misconfigured or compromised.

In this example, the graph analytics system 213 identifies vertex 203 as the most important vertex of the relationship graph 119 and thus corresponds to the most important cloud resource within the cloud environment modeled by the relationship graph 119. As depicted in FIG. 2, the vertex 203 has an in-degree of four and an out-degree of four, which is the most total relationships of any of the vertices in the relationship graph 119. The graph analyzer 107 generates the results 221 to indicate that the vertex 203, which corresponds to a network interface with identifier "netinterface-af8d," is the most critical resource in the cloud environment and that incidents impacting this resource may be fatal to a significant portion of the infrastructure as a result.

A second of the graph database queries 223 in this example indicates for the graph analytics system 213 to perform SCC analysis of the relationship graph 119. As indicated in Table 1, when the conventional implementation of the algorithm is applied to a directed graph representing cloud resources and their relationships, SCC facilitates identification of groups of cloud resources which are closely related. An incident affecting one of the cloud resources in the group thus may impact each of the other cloud resources in the group, so checks of cloud resources should be performed for each of the cloud resources in the group in the event of an incident.

In this example, the graph analytics system identifies a cluster 211 of vertices as a group of strongly connected components. The vertices belonging to the cluster 211, of which there are five, are at most one "hop" away from other vertices in the cluster 211. The graph analyzer 107 generates the results 221 to indicate that the cluster 211, which corresponds to a group comprising subnets, a route table, and an access control list with identifiers "subnet-3d1," "subnet-d67," "subnet-959," "rtb-f642," and "ac-ac3c," is a cluster of SCCs and incidents impacting any of the identified cloud resources may impact the other cloud resources in the cluster.

A third of the graph database queries 223 in this example indicates for the graph analytics system 213 to perform betweenness centrality analysis of the relationship graph 119. As indicated in Table 1, when the conventional implementation of the algorithm is applied to a directed graph representing cloud resources and their relationships, betweenness centrality facilitates identification of potential weakest links in the cloud environment as well as cloud resources which may be the source of bottlenecks due to having the greatest number of shortest paths passing through the corresponding vertices in the relationship graph 119. This is because betweenness centrality can be used to identify bridges between groups of vertices in a directed graph. A cloud resource identified as serving as a bridge is therefore highlighted as the source of potential bottlenecks due to serving different groups of cloud resources and/or being the weakest link due to the graph "breaking" if the cloud resource is misconfigured or compromised. Conversely, vertices having the least number of shortest paths passing through may correspond to cloud resources having minimal use in the cloud environment and thus may be incurring costs without a strong contribution to the infrastructure. Whether the graph analytics system 213 determines vertices with the greatest or least betweenness centrality can be denoted by a parameter value provided in the graph database queries 223.

In this example, the graph analytics system 213 identifies the vertex of the relationship graph 119 which has the least betweenness centrality, which is vertex 205. The vertex 205 does not have any edges to or from other vertices in the relationship graph 119. The graph analyzer 107 generates the results 221 to indicate that the vertex 205, which corresponds to an Internet gateway with identifier "InternetGateway-8bc," may be incurring costs without substantial impact on the infrastructure.

Alternatively, or in addition, to the analysis of impact of potential incidents on a cloud environment as described above, the results 221 may indicate whether an incident detected for at least a first cloud resource can be considered critical to the cloud environment based on the analysis executed on the graph database 109. For instance, the graph analyzer 107 can maintain one or more thresholds corresponding to a rank or score of a vertex which is indicative of a critical result for a respective one of the analysis types. With respect to the PageRank and betweenness centrality results, a first threshold may indicate a PageRank rank or score, and a second threshold may indicate a betweenness centrality rank or score, respectively. If a vertex corresponding to a cloud resource impacted by a misconfiguration or compromise receives a rank or score which satisfies either of the thresholds, the graph analyzer 107 indicates that the misconfiguration or compromise may be critical to the cloud environment. As another example with respect to the SCC results, if a vertex corresponding to a cloud resource impacted by a misconfiguration or compromise is determined to belong to a subgraph of SCCs, the graph analyzer 107 indicates the misconfiguration or compromise may be critical for the cloud environment. The results 221 thus may also indicate whether one or more previously detected incidents should be considered critical and high priority for remediation or corrective action.

FIGS. 3A–5C are example operations for graph-based impact analysis of misconfigured or compromised cloud resources. The example operations are described with reference to a graph generator or a graph analyzer for consistency with the earlier figures. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

Figure 3A:
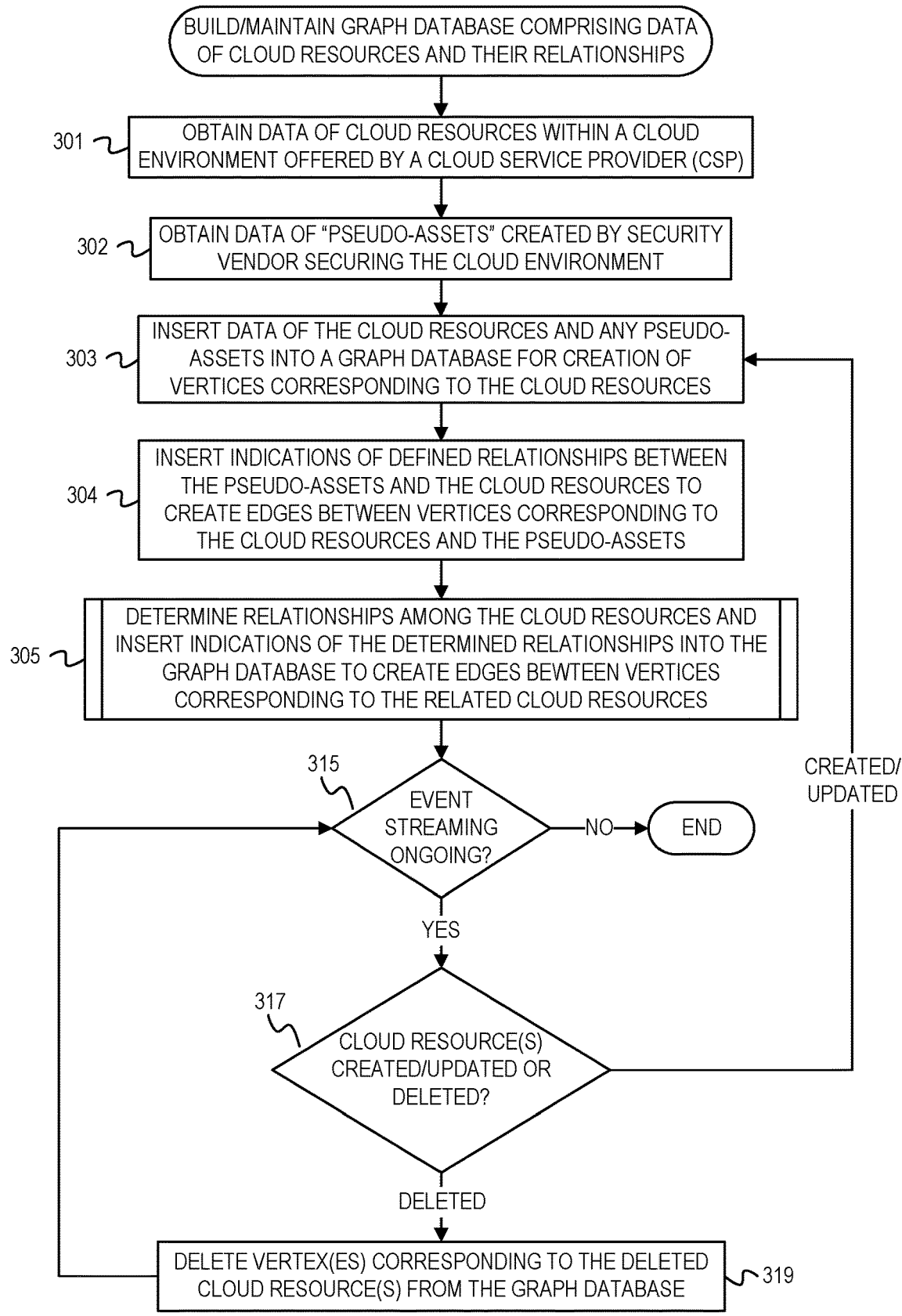
FIGS. 3A-3B are a flowchart of example operations for building and maintaining a graph database comprising data of cloud resources and their relationships.
Figure 3B:
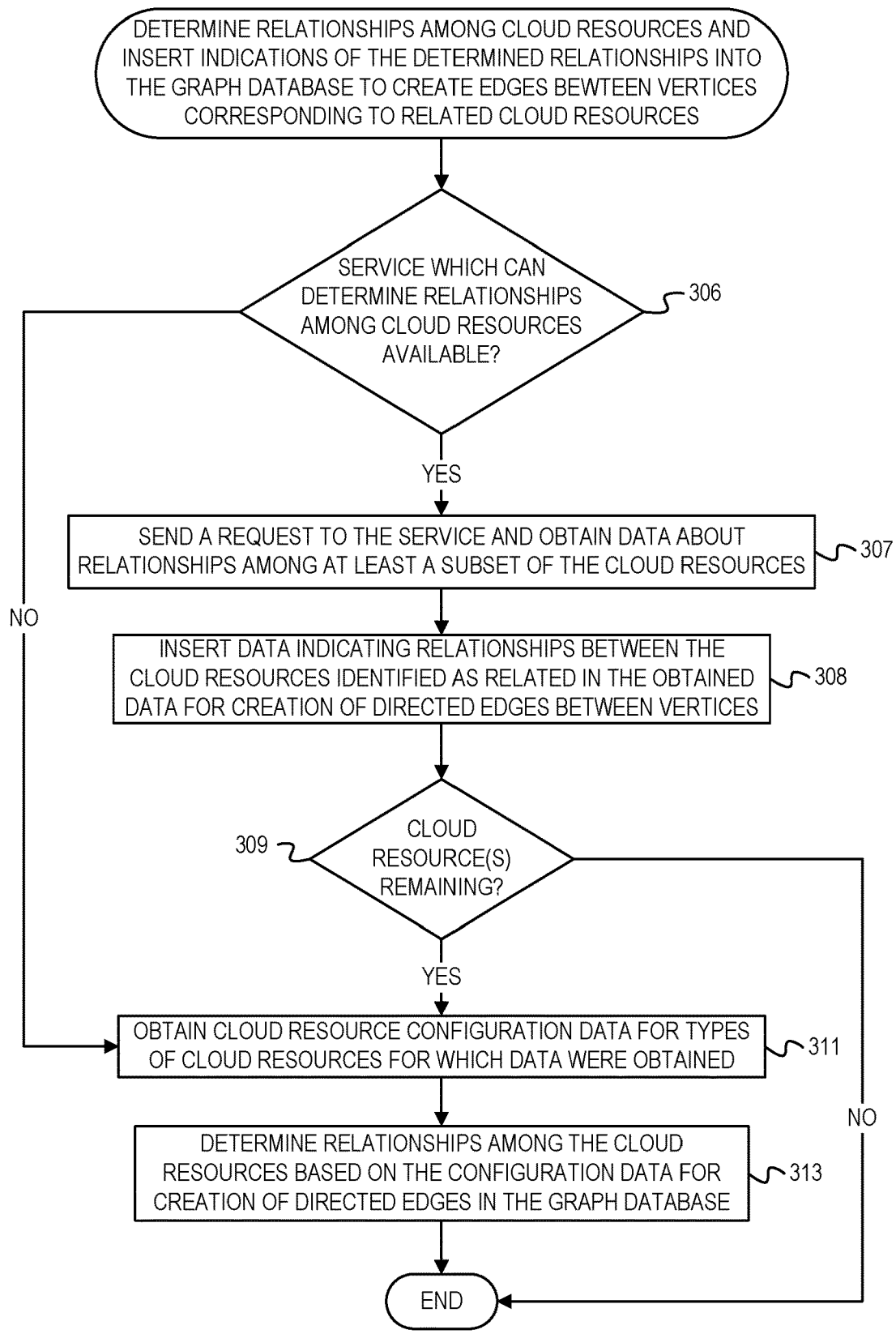

FIGS. 3A–3B are a flowchart of example operations for building and maintaining a graph database comprising data of cloud resources and their relationships. At block 301, the graph generator obtains cloud resource data for one or more cloud resources within a cloud environment offered by a CSP. The graph generator can obtain the cloud resource data by calling functions of an API of the CSP, such as the APIs of one or more services of the CSP by which cloud resource data can be obtained. The function calls may indicate an identifier of the cloud account for which the associated cloud resource data are to be retrieved. The graph generator may obtain the cloud resource data through subscription to an event stream to which a logging service of the CSP publishes event data, where events correspond to creation, update, deletion, etc. of cloud resources and indicate the respective cloud resource data. Subscription to the event stream may be ongoing for building/maintaining the graph database or may be for a configurable time window (e.g., to obtain cloud resource data logged during a 30 minute period).

At block 302, the graph generator obtains data of any "pseudo-assets" created by a security vendor which secures the cloud environment and of which the graph generator may be part. A pseudo-asset is an asset defined by a security vendor which secures the cloud environment and may not necessarily be an asset that is part of the cloud environment itself. For instance, a pseudo-asset may be defined for aggregated network exposure determined for a cloud resource. Pseudo-assets facilitate querying of cloud resources by security-related characteristics. The security vendor should also have defined relationship templates which specify relationships between recognized pseudo-assets and cloud resources. The relationship templates may be represented with JSON and indicate the start/from and end/to entity (i.e., pseudo-asset or cloud resource). The graph generator can obtain the data of the pseudo-assets and the related relationship templates from the security vendor.

At block 303, the graph generator inserts data of the cloud resources and any pseudo-assets into a graph database for creation of corresponding vertices The cloud resource data obtained from the CSP for the cloud account are inserted into a graph database such that a vertex is created for storage of the data of each cloud resource. Each vertex at least comprises a property corresponding to the identifier of the respective cloud resource. The cloud resource data may be inserted into the graph database via submission of a command/request for creation of or updates to data stored in vertices to the graph database (e.g., via an API for a Hypertext Transfer Protocol (HTTP) PUT request). The graph generator also inserts data of any pseudo-assets obtained from the security vendor into the graph database for creation of corresponding vertices.

At block 304, the graph generator inserts indications of defined relationships between the pseudo-assets (if any) and the cloud resources to create edges between vertices corresponding to the cloud resources and the pseudo-assets. The graph generator submits one or more commands for edge creation to the graph database which indicate identifiers of the start/from and end/to entities associated with the types which are denoted in the pseudo-asset relationship templates obtained from the security vendor. The graph generator determines the identifiers to indicate in the commands based on determining the cloud resources for which data have been obtained that specify the type of cloud resource indicated in the relationship template and then determines the identifiers indicated in that cloud resource data. Submission of the commands results in creation of directed edges between the start and end vertices which identify the corresponding cloud resource and pseudo-asset identifiers indicated in the pseudo-asset relationship template(s) obtained from the security vendor.

At block 305, the graph generator determines relationships among the cloud resources and inserts indications of the determined relationships into the graph database for creation of edges between vertices corresponding to the related cloud resources. FIG. 3B depicts example operations for determining relationships among cloud resources.

At block 306 of FIG. 3B, the graph generator determines if there is a service of the CSP available which can determine relationships among cloud resources. Some CSPs can offer a service which identifies cloud resources associated with a cloud account and determines relationships among the identified cloud resources based on resource configuration data maintained by the CSP. The graph generator has been configured to utilize the service of the CSP if such a service is offered by the particular CSP providing the cloud environment being analyzed. If such a service is available, operations continue at block 307. If no such service is available, operations continue at block 311.

At block 307, the graph generator sends a request to the service which indicates the cloud environment and obtains data about relationships among at least a subset of the cloud resources of types which the service supports. The graph generator can send the request to the service via an API exposed by the service. The request may indicate identifying information of the cloud environment, such as an identifier of an associated cloud account. As a response, the graph generator obtains data which indicates relationships among pairs of cloud resources of the types which are supported by the service of the CSP, where the pairs of cloud resources indicate identifiers of the cloud resources also indicated in the obtained cloud resource data.

At block 308, the graph generator inserts data indicating relationships between the cloud resources identified as related in the obtained data for creation of directed edges between vertices. The graph generator generates commands for each of the determined relationships reflected in the data obtained from the service of the CSP which indicate, for each relationship between first and second cloud resources in a pair of related cloud resources indicated in the relationship data, the first cloud resource as a start vertex and the second cloud resource as an end vertex. Submission of the commands to the graph database results in creation of a directed edge stored in the graph database which connects the vertices storing identifiers of the first and second cloud resources, thus capturing the relationships among cloud resources in a graph representation. Determination of the start and end vertices from the relationship data obtained from the service of the CSP may be based on structure of the relationship data. For instance, a relationship of "VPC217 contains net_interface512" indicates that the vertex identifying "VPC217" should be the start vertex for a directed edge to the vertex identifying "net_interface512."

At block 309, the graph generator determines if any cloud resources remain for which relationships have not been determined. Any remaining cloud resources are those of the types which are not supported by the service of the CSP. The graph generator may have been configured to determine types which are known to be unsupported by the service of the CSP based on the identity/type of the CSP so that it can be determined that cloud resources remain if any of the obtained cloud resource data correspond to cloud resources of those types. If one or more cloud resources of unsupported types remain, operations continue at block 311. If no cloud resources are remaining, operations continue at block 315 of FIG. 3A.

At block 311, the graph generator obtains cloud resource configuration data from the CSP for the types of cloud resources for which data have been obtained. The graph generator can obtain the configuration data via calls to one or more functions of an API exposed by the CSP or the services which it offers, where the services correspond to cloud resources of one or more types. The configuration data obtained for each cloud resource type should at least indicate the relationships which cloud resources of that type have with cloud resources of other types.

At block 313, the graph generator determines relationships among the cloud resources based on the configuration data for creation of directed edges in the graph database. For each of the configuration data obtained for cloud resources of a given type, the graph generator can determine the cloud resources represented with vertices that identify that cloud resource type. The graph generator can then determine the other types of cloud resources indicated as being related to that cloud resource type in the configuration data and identify those of the cloud resources represented with vertices that indicate the related cloud resource types. To determine direction of the directed edges which should be created among these vertices indicating related cloud resource types, if structure of the configuration data is known (e.g., end/to and start/from cloud resource types are represented in the data and the representation is known), the graph generator may maintain rules which indicate the key/value pairs for which to search and identify the relationships from which directed edges are created. If the structure is not known, the graph generator can infer the start and end vertices from the relationship data based on heuristics, such as keywords generally used to indicate a start/from cloud resource and an end/to cloud resource. As pairs of related cloud resource types and their corresponding vertices are identified and the directions of the edges by which they should be connected are determined, the graph generator inserts the directed edges via submission of commands to the graph database. The commands indicate identifiers of cloud resources or cloud resource types stored in vertices which should be the start and end vertices of the directed edge. The commands may also indicate a type of relationship which should be stored as a property, attribute, etc. of the directed edge.

Returning to FIG. 3A, at block 315, the graph generator determines if event streaming is ongoing. If event streaming is ongoing (e.g., during the defined time window of streaming), additional event data indicating updated cloud resources, created/provisioned cloud resources, and/or deleted cloud resources may be communicated to the graph generator over the event stream, which facilitates dynamic updating of the graph database as cloud resources within the cloud environment change. The graph representation stored in the graph database can be updated as a result of creation, updating, or deletion of cloud resources in the cloud environment. If event streaming is ongoing, operations continue at block 317. If event streaming is not ongoing, operations are complete, though event streaming may commence again later (e.g., after a configurable interval of time) for periodic updates to the graph database.

At block 317, the graph generator determines if one or more cloud resources have been created/updated or have been deleted based on the event data received on the event stream. Create events prompt insertion of cloud resource data into the graph database for creation of a vertex. Update events prompt updating of cloud resource data stored in the graph database for updating an existing vertex. Delete events prompt deletion of cloud resource data from the graph database for deletion of a vertex. The event data may indicate event type in addition to the cloud resource data which the graph generator can leverage to determine whether the event type is create/update or delete. If a cloud resource(s) has been created or updated, operations continue at block 303. If a cloud resource(s) has been deleted, operations continue at block 319.

At block 319, the graph generator deletes the vertex(es) corresponding to the deleted cloud resource(s) from the graph database. The graph generator may delete the vertex(es) through submission of a command/request to the graph database for vertex deletion which indicates the identifier(s) of the cloud resource(s) to be delete (e.g., via an API for an HTTP DELETE request). Operations continue at block 315.

Figure 4A:
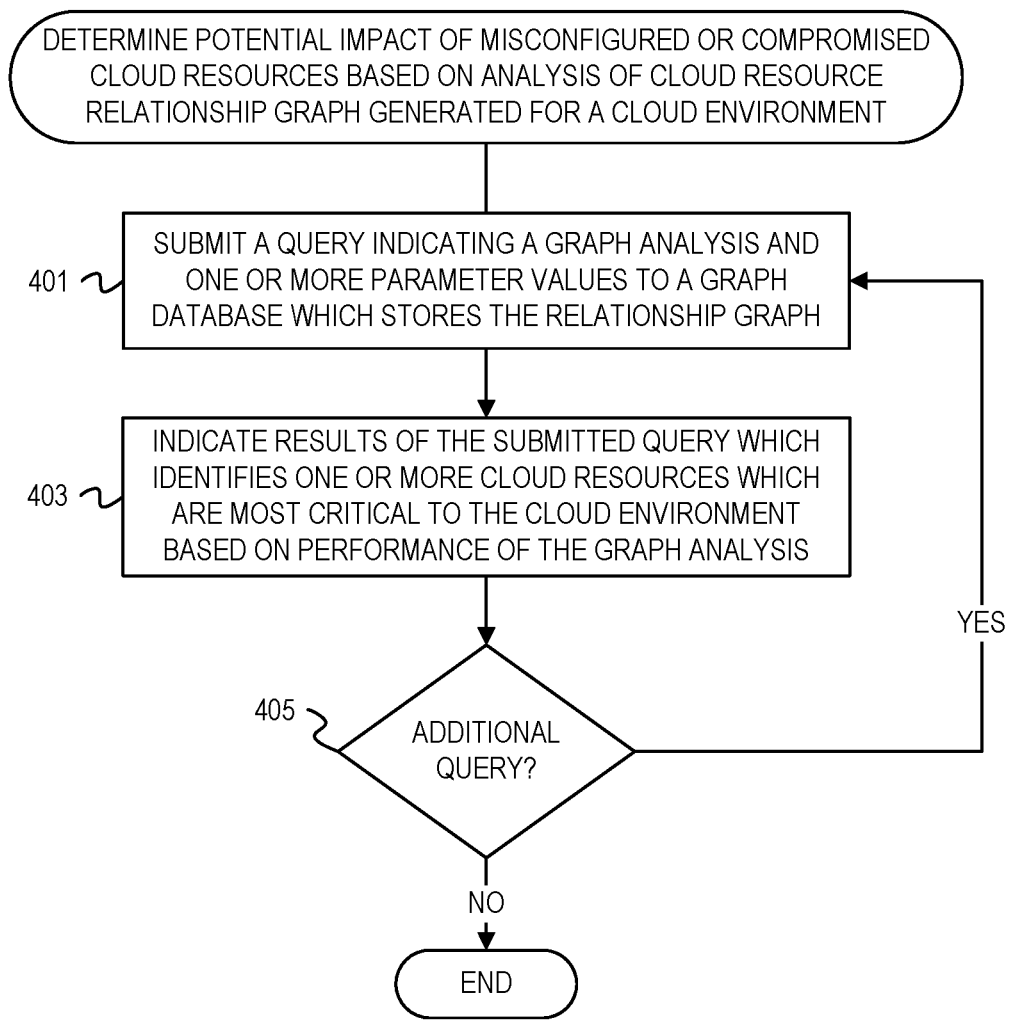
FIGS. 4A-4B are flowcharts of example operations for using a relationship graph generated for a cloud environment to perform impact analysis of misconfigured or compromised cloud resources.
Figure 4B:
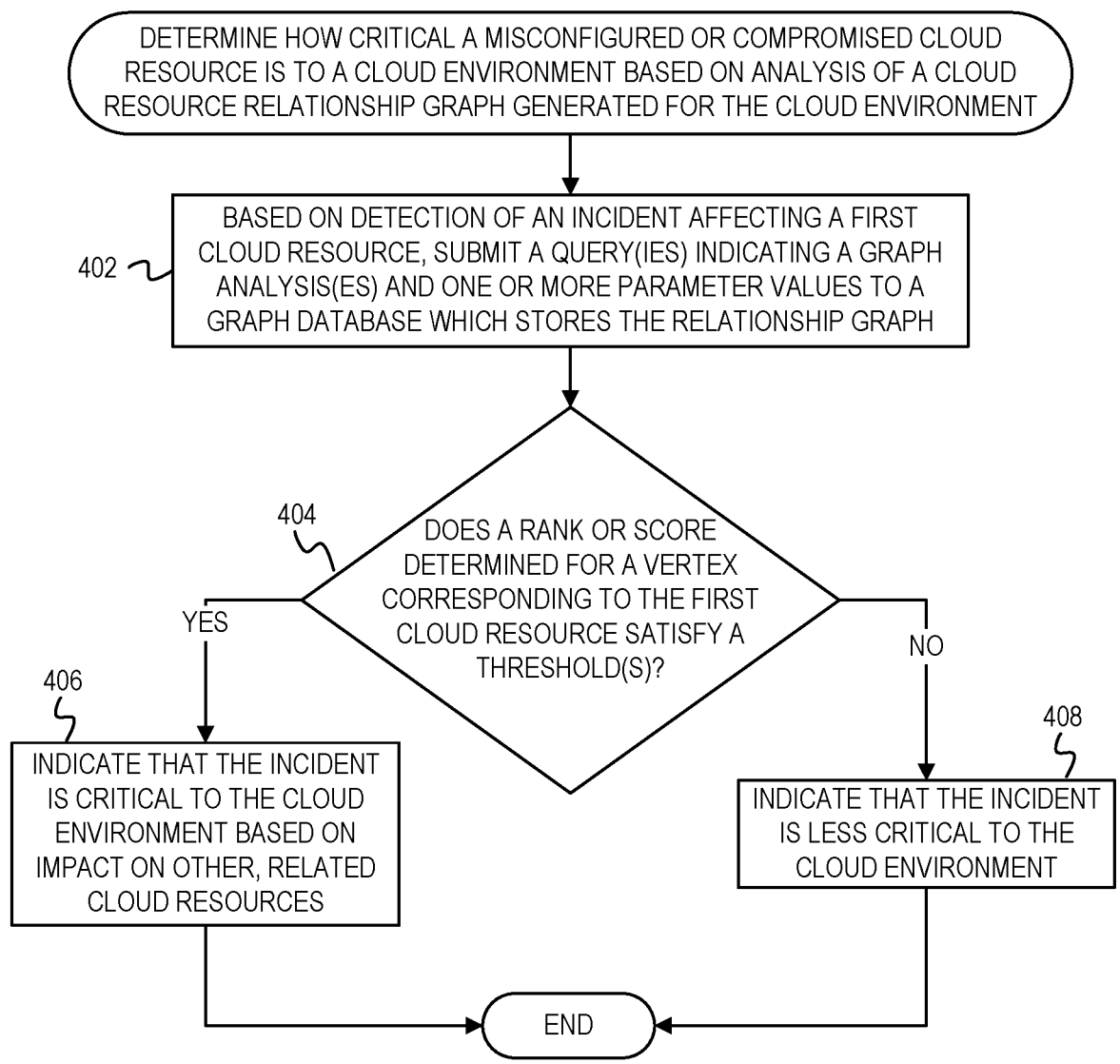

FIGS. 4A-4B are flowcharts of example operations for using a relationship graph generated for a cloud environment to perform impact analysis of misconfigured or compromised cloud resources. FIG. 4A depicts example operations for determining potential impact of misconfigured or compromised cloud resources based on the relationship graph, where the results of the analysis indicate the most critical cloud resource(s) in the cloud environment. FIG. 4B depicts example operations for determining how critical an impact of a misconfigured or compromised cloud resource is on the cloud environment. "Most/more critical" cloud resources are those which would have a greater impact on other resources in the cloud environment if misconfigured or compromised based on being directly or indirectly related to more cloud resources relative to other cloud resources. The more critical cloud resources may thus be those having a larger blast radius in the cloud environment (i.e., which would also have an impact on multiple related cloud resources) if misconfigured or compromised. The cloud resource relationship graph can be represented with a graph database which stores cloud resource data as vertices and determined relationships between the cloud resources as directed edges.

Referring to FIG. 4A, at block 401, the graph analyzer submits a query indicating a graph analysis and one or more parameter values to the graph database. The query may be submitted to the graph analyzer via the user interface so that the graph analyzer acts as an interface for the graph database for user-submitted queries. Alternatively, or in addition, the query may have been previously written and cached at the graph analyzer. In some examples, the query may be part of set of queries cached at the graph analyzer which specify a predetermined misconfiguration or compromise impact analysis performed for the cloud environment. Examples of graph analyses which may be indicated in queries submitted to the graph database are given above in Table 1. The parameter value(s) may specify how results should be ranked or ordered, such as in ascending or descending order by vertex scores. The parameter value(s) may specify a top or bottom number of results which should be returned or a threshold(s) for vertex rank and/or scores, such as the cloud resources corresponding to the vertices with the top N or bottom N scores or corresponding to the top M scoring or ranked vertices.

At block 403, the graph analyzer indicates results of the submitted query which identifies one or more cloud resources which are most critical to the cloud environment. The result of the submitted query indicates one or more cloud resources identified as a result of executing the graph analysis indicated in the query on the graph database. One or more vertices may be identified as a result of executing the graph analysis, such as a vertex(es) which has a score or rank which satisfies the threshold(s) indicated in the query or a subgraph of vertices which form a group of SCCs. The result which the graph analyzer indicates can thus indicate an identifier(s) of the cloud resource(s) which correspond to the vertex(es) identified as a result of the graph analysis (e.g., based on storage of the cloud resource identified in the vertex).

At block 405, operations continue based on whether an additional query is to be submitted. The graph analyzer may receive an additional query submitted via a user interface or may determine that an additional query has been written and cached at the graph analyzer. If there is an additional query, operations continue at block 401. If there are no additional queries, operations are complete.

Referring to FIG. 4B, at block 402, based on detection of an incident affecting a first cloud resource, the graph analyzer submits at least a first query indicating a graph analysis and one or more parameter values to the graph database. The incident may be a misconfiguration or a compromise of the first cloud resource. Utilizing the graph database to determine impact of the incident on the rest of the cloud environment can thus inform whether the incident affected a more critical cloud resource and in turn has a more critical impact on the cloud environment. As described above, each query may be submitted to the graph analyzer via the user interface so that the graph analyzer acts as an interface for the graph database for user-submitted queries. Alternatively, or in addition, the query may have been previously written and cached for storage at the graph analyzer. In some examples, the query may be part of set of pre-written and cached queries which specify a predetermined incident impact analysis performed for the cloud environment. Examples of graph analyses which may be indicated in each query submitted to the graph database are given above in Table 1. The parameter value(s) may specify how results should be ranked or ordered, such as in ascending or descending order by vertex scores. The parameter value(s) may specify a top or bottom number of results which should be returned and/or a threshold(s) for vertex rank(s)/score(s), such as the cloud resources corresponding to the vertices with the top or bottom N scores or corresponding to the top M scoring or ranked vertices. The query(ies) may also specify the identifier of the first cloud resource so that the results corresponding to the misconfigured or compromised cloud resource are also returned and indicated.

At block 404, the graph analyzer determines if a rank or score determined for a vertex stored in the graph database which corresponds to the first cloud resource satisfies a threshold(s). As described at block 402, the query may have indicated a rank or score threshold(s) for each of the graph analyses indicated in the query(ies). In other examples, the graph analyzer may maintain thresholds for one or more of the supported graph algorithms which are configurable values. The graph analyzer evaluates the rank(s) and/or score(s) determined for the vertex which identifies the first cloud resource against each of the pertinent thresholds. If the rank or score satisfies the threshold(s), operations continue at block 406. If the rank or score does not satisfy the threshold, operations continue at block 408.

At block 406, the graph analyzer indicates (e.g., through generation of a notification, report, etc.) that the incident is critical to the cloud environment based on the impact on other, related cloud resources. The impact of the incident is reflected in the rank or score of the respective vertex determined from performance of the graph analysis. Thus, if the rank(s) or score(s) determined from the analysis satisfy the threshold(s), the impact can be indicated as being critical due to relatedness of the first cloud resource with other cloud resources. The graph analyzer may indicate (e.g., organize) results by graph algorithm or analysis type. For instance, for each of the graph algorithms or analysis types indicated in the one or more submitted queries, the results may indicate the vertex corresponding to the first cloud resource's rank/score determined from the graph algorithm or analysis type and a description of how the rank/score can be interpreted as provided above in Table 1.

At block 408, the graph analyzer indicates that the incident is less critical to the cloud environment. If the rank/score of the vertex associated with the first cloud resource did not satisfy any of the thresholds which are indicative of a more critical impact on the cloud environment, then the incident can be determined to be less critical in that fewer to no resources or less important resources are impacted by the incident.

Figure 5A:
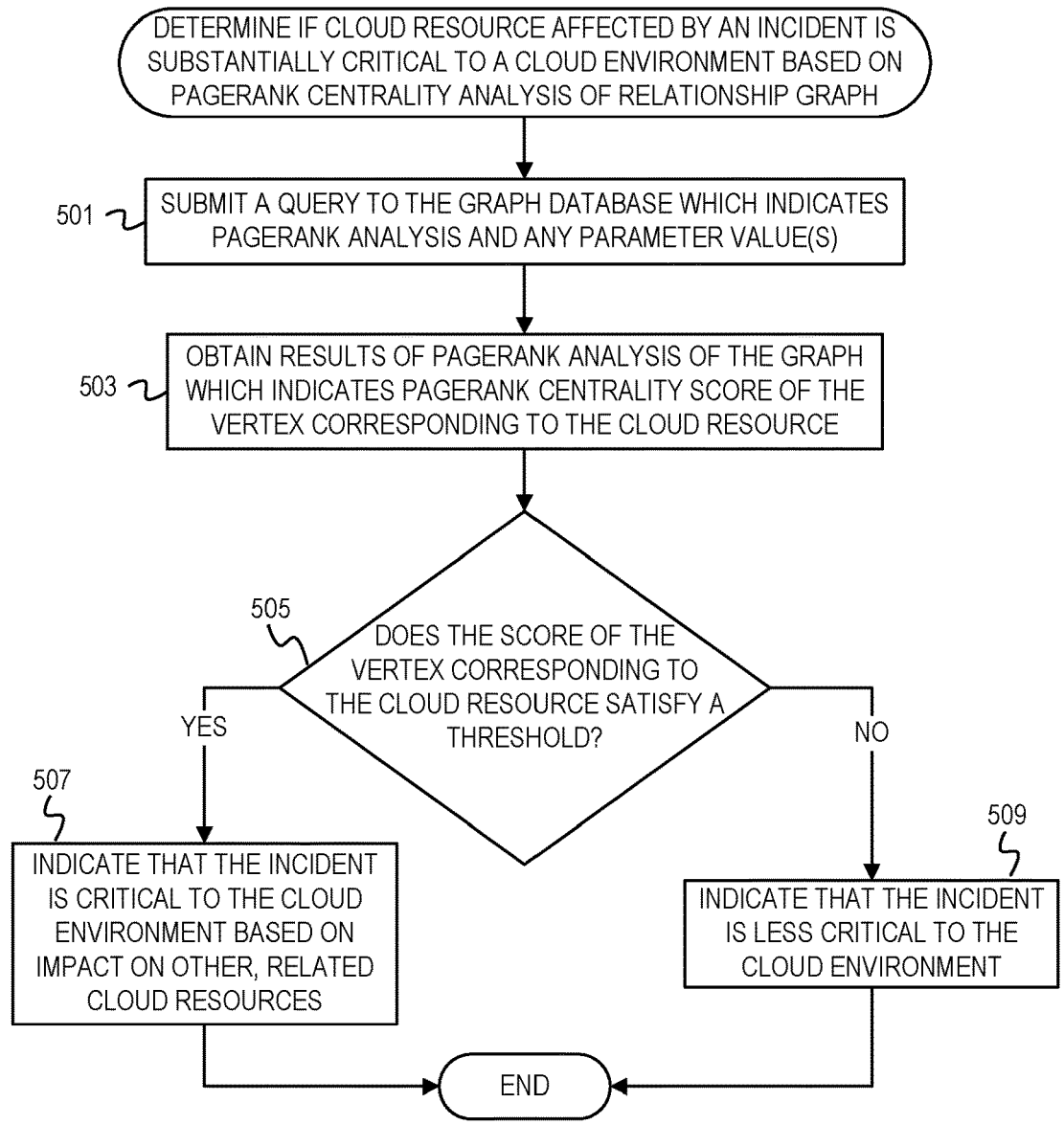
FIG. 5A is a flowchart of example operations for determining if a cloud resource affected by an incident is substantially critical to a cloud environment based on PageRank centrality analysis of the relationship graph.
Figure 5B:
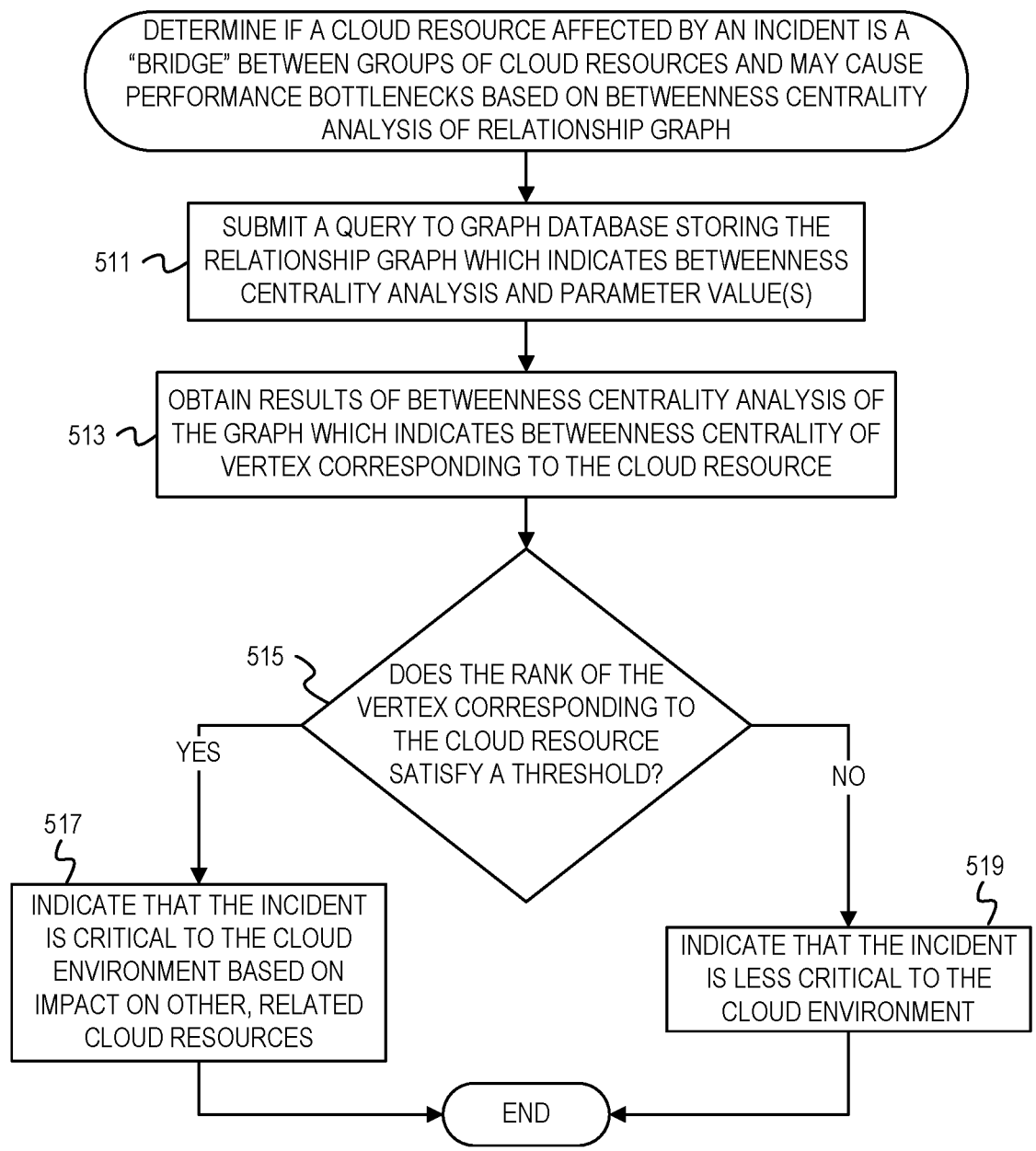
FIG. 5B is a flowchart of example operations for determining if a cloud resource affected by an incident is a "bridge" between groups of related cloud resources and may cause performance bottlenecks as a result of the incident based on betweenness centrality analysis of the relationship graph.
Figure 5C:
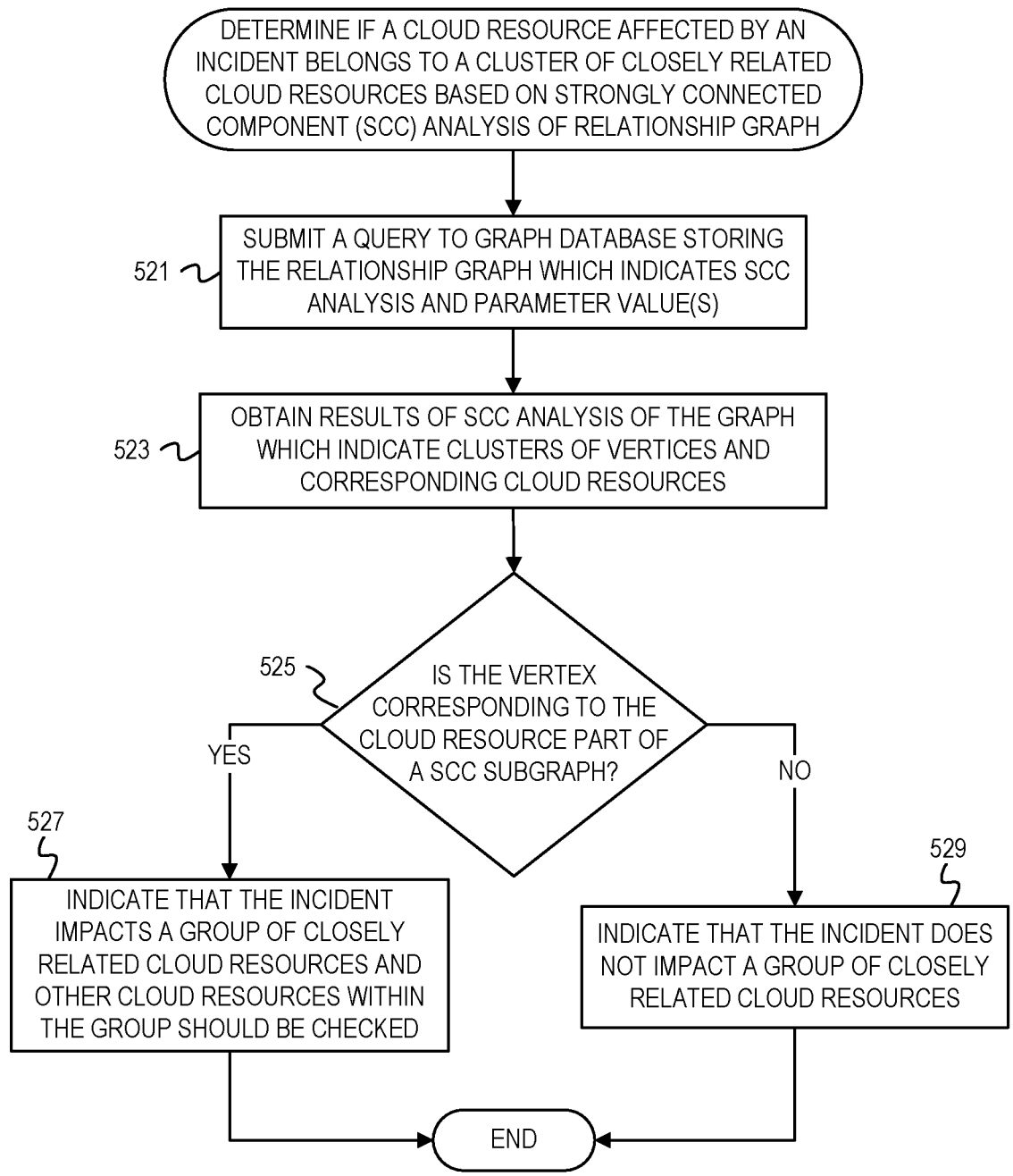
FIG. 5C is a flowchart of example operations for determining if a cloud resource affected by an incident belongs to a cluster of closely related cloud resources based on SCC analysis of the relationship graph.

FIGS. 5A-5C depict flowcharts of example operations for performing impact analysis of misconfigured or compromised cloud resources for a cloud environment based on a cloud resource relationship graph. The example operations detail different analyses which can be performed to determine the most critical cloud resource(s) in a cloud environment as described in reference to FIG. 4A and/or how critical a misconfigured or compromised cloud resource is in terms of impact on the rest of the cloud environment as described in reference to FIG. 4B. While the example operations refer to the latter case in which an incident affecting a first cloud resource has already been detected, the following graph algorithms can also be applied for the former case for discovery of critical cloud resources. Additionally, other combinations/sets of graph analyses can be performed as part of incident impact analysis.

FIG. 5A is a flowchart of example operations for determining if a cloud resource affected by an incident is substantially critical to a cloud environment based on PageRank centrality analysis of the relationship graph. With respect to the PageRank centrality algorithm, cloud resources corresponding to vertices indicated as more important in the relationship graph are those deemed more critical to the cloud environment if misconfigured or compromised.

At block 501, the graph analyzer submits a query to the graph database which indicates PageRank graph analysis and any parameter values. The query may be obtained via submission to a user interface. The parameter values may include an indication to sort results in descending order (i.e., vertices will be ranked by score indicating relative importance) and/or to return indications of the top N vertices ranked by importance determined by PageRank centrality score. The parameter values may include an identifier of the cloud resource affected by the incident. At block 503, the graph analyzer obtains results of the PageRank analysis which may at least indicate a PageRank centrality score of the vertex corresponding to the cloud resource.

At block 505, the graph analyzer determines if the score of the vertex corresponding to the cloud resource satisfies a threshold. The threshold PageRank score may have been indicated as a parameter value or may be a configurable value maintained by the graph analyzer. If the score satisfies the threshold, operations continue at block 507. If the score does not satisfy the threshold, operations continue at block 509.

At block 507, the graph analyzer indicates that the incident is critical to the cloud environment based on its impact on other, related cloud resources. The graph analyzer may generate a notification, add the indication of results to a report, etc. to indicate that the incident is critical. A description of the results may indicate that the incident has a large blast radius in terms of the related cloud resources which may also be affected by the incident, so the related cloud resources should also be checked for any remediation of the incident or corrective action in addition to the affected cloud resource.

At block 509, the graph analyzer indicates that the incident is less critical to the cloud environment. The incident may be deemed less critical if the vertex corresponding to the cloud resource is indicated as being less important in the results of the PageRank centrality analysis (e.g., based on having a lower PageRank score indicating lower relative importance).

FIG. 5B is a flowchart of example operations for determining if a cloud resource affected by an incident is a "bridge" between groups of related cloud resources and may cause performance bottlenecks as a result of the incident based on betweenness centrality analysis of the relationship graph. A cloud resource may be a "bridge" between groups of related cloud resources if each or most of the shortest paths between vertices belonging to two or more groups passes through the vertex corresponding to the cloud resource as determined with the betweenness centrality algorithm. With respect to the betweenness centrality analysis of the relationship graph, cloud resources corresponding to vertices indicated as having a higher betweenness centrality are deemed more critical to the cloud environment if misconfigured or compromised.

At block 511, the graph analyzer submits a query to the graph database which indicates betweenness centrality analysis and one or more parameter values. The query may be obtained via submission to a user interface. The parameter values may include an indication to sort results in descending order of betweenness centrality and/or to return indications of the vertices with the top/bottom N betweenness centralities. The parameter values may include an identifier of the cloud resource affected by the incident. At block 513, the graph analyzer obtains results of the betweenness centrality analysis which may at least indicate a betweenness centrality of the vertex corresponding to the cloud resource.

At block 515, the graph analyzer determines if the rank of the vertex corresponding to the cloud resource satisfies a threshold. The threshold betweenness centrality rank may have been indicated as a parameter value or may be a configurable value maintained by the graph analyzer. For example, a rank threshold of three indicates that the top three ranked vertices (i.e., those having the three greatest betweenness centralities) will satisfy the threshold. If the rank satisfies the threshold, operations continue at block 517. If the rank does not satisfy the threshold, operations continue at block 519.

At block 517, the graph analyzer indicates that the incident is critical to the cloud environment based on its impact on other, related cloud resources. The graph analyzer may generate a notification, add the indication of results to a report, etc. to indicate that the incident is critical. A description of the results may indicate that the misconfiguration or compromise affecting the cloud resource may result in performance bottlenecks since the cloud resource is a weak point in the cloud resource relationship graph and may "break" the graph as a result of the misconfiguration or compromise. The description may also indicate that groups of other cloud resources bridged by the vertex(es) corresponding to the cloud resource should be checked for any remediation or corrective action.

At block 519, the graph analyzer indicates that the incident is less critical to the cloud environment. The incident may be deemed less critical if the vertex corresponding to the cloud resource is indicated as having fewer to no shortest paths passing through the vertex in the relationship graph. In some implementations, if the betweenness centrality of the vertex is below a score threshold or the rank is in the bottom M of the vertices, where M may be a parameter value or a configurable value maintained by the graph analyzer, the graph analyzer may indicate that the cloud resource has minimal impact on the cloud environment and may further be accumulating costs without substantial contribution to the rest of the cloud environment.

FIG. 5C is a flowchart of example operations for determining if a cloud resource affected by an incident belongs to a cluster of closely related cloud resources based on SCC analysis of the relationship graph. Such clusters of cloud resources correspond to strongly connected components which form a subgraph of the relationship graph and can be identified with the SCC algorithm.

At block 521, the graph analyzer submits a query to the graph database which indicates SCC analysis and one or more parameter values. The query may be obtained via submission to a user interface. The parameter values may include an identifier of the cloud resource affected by the incident. The parameter values may include an indication to sort the returned indications of SCCs by decreasing subgraph size (i.e., member vertex count). At block 523, the graph analyzer obtains results of the SCC analysis which indicate clusters of vertices and corresponding cloud resources.

At block 525, the graph analyzer determines if the vertex corresponding to the cloud resource is part of a subgraph of SCCs. If the vertex is part of a subgraph of SCCs, operations continue at block 527. If the vertex is not part of a subgraph of SCCs, operations continue at block 529.

At block 527, the graph analyzer indicates that the incident impacts a group of closely related cloud resources and that other cloud resources within the group should be checked for remediation or corrective action. The graph analyzer may generate a notification, add the indication of results to a report, etc. to indicate that the cloud resource belongs to a group of closely related cloud resources based on identification of the corresponding vertex as belonging to a subgraph of SCCs. The graph analyzer may thus indicate that the incident is more critical due to the potential impact of the incident on multiple other cloud resources which rely on or are relied on by the affected cloud resource.

At block 529, the graph analyzer indicates that the incident does not impact a group of closely related cloud resources. If the cloud resource is not part of a group of SCCs, the incident may not impact multiple cloud resources within a group in which each of the cloud resources relies on or is relied on by another and thus can be indicated as being less critical to the cloud environment.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 303 and 304 can be performed in parallel or concurrently. Additionally, in some implementations, the example operations of FIG. 3A can be performed without the operations depicted at blocks 302, 304, and 315-319. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 6:
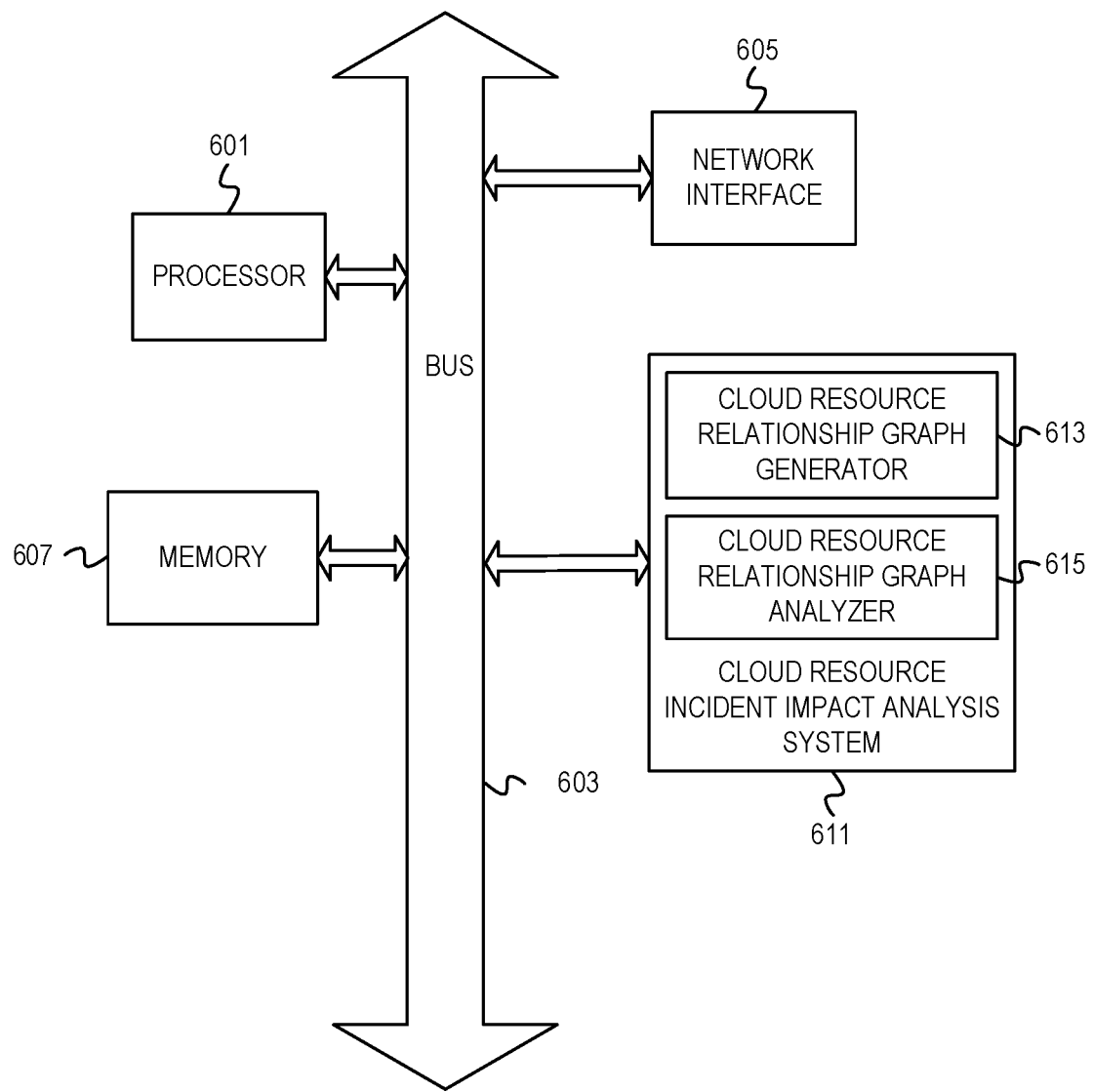
FIG. 6 depicts an example computer system with a cloud resource incident impact analysis system.

FIG. 6 depicts an example computer system with a cloud resource incident impact analysis system. The computer system includes a processor 601 (possibly including multiple processors, multiple cores, multiple vertices, and/or implementing multi-threading, etc.). The computer system includes memory 607. The memory 607 may be system memory or any one or more of the above already described possible realizations of machine-readable media. The computer system also includes a bus 603 and a network interface 605. The system also includes cloud resource incident impact analysis system 611, which includes a cloud resource relationship graph generator ("graph generator") 613 and a cloud resource relationship graph analyzer ("graph analyzer") 615. The graph generator 613 determines relationships among cloud resources associated with a cloud account/cloud environment and builds a graph representation of the cloud resources and their relationships. The graph analyzer 615 utilizes the graph representation of the cloud resources and their relationships for analyzing impact of misconfigurations or compromises of cloud resources on the rest of the cloud environment. While depicted as part of the cloud resource incident impact analysis system 611 in FIG. 6, the graph generator 613 and graph analyzer 615 do not necessarily execute on the same device. Any one of the previously described functionalities may be partially (or entirely) implemented in hardware and/or on the processor 601. For example, the functionality may be implemented with an application specific integrated circuit, in logic implemented in the processor 601, in a co-processor on a peripheral device or card, etc. Further, realizations may include fewer or additional components not illustrated in FIG. 6 (e.g., video cards, audio cards, additional network interfaces, peripheral devices, etc.). The processor 601 and the network interface 605 are coupled to the bus 603. Although illustrated as being coupled to the bus 603, the memory 607 may be coupled to the processor 601.

While the aspects of the disclosure are described with reference to various implementations and exploitations, it will be understood that these aspects are illustrative and that the scope of the claims is not limited to them. In general, techniques for graph-based impact analysis of misconfigured or compromised cloud resources as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Terminology

This description uses shorthand terms related to cloud technology for efficiency and ease of explanation. When referring to "cloud resource," this description is referring to the resources of a cloud service provider. For instance, a cloud resource can encompass the servers, virtual machines, and storage devices of a cloud service provider. In more general terms, a cloud service provider resource accessible to customers is a resource owned/managed by the cloud service provider entity that is accessible via network connections. Often, the access is in accordance with an application programming interface or software development kit provided by the cloud service provider.

This description uses the term "data stream" to refer to a unidirectional stream of data flowing over a data connection between two entities in a session. The entities in the session may be interfaces, services, etc. The elements of the data stream will vary in size and formatting depending upon the entities communicating with the session. Although the data stream elements will be segmented/divided according to the protocol supporting the session, the entities may be handling the data at an operating system perspective and the data stream elements may be data blocks from that operating system perspective. The data stream is a "stream" because a data set (e.g., a volume or directory) is serialized at the source for streaming to a destination. Serialization of the data stream elements allows for reconstruction of the data set. The data connection over which the data stream flows is a logical construct that represents the endpoints that define the data connection. The endpoints can be represented with logical data structures that can be referred to as interfaces. A session is an abstraction of one or more connections. A session may be, for example, a data connection and a management connection.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A computer-implemented method comprising:
based on identifying a plurality of cloud resources associated with a cloud environment, determining relationships among the plurality of cloud resources;
generating a graph database from data of the plurality of cloud resources and the relationships among the plurality of cloud resources, wherein the graph database stores a graph representation of the plurality of cloud resources and the relationships;

determining which of the plurality of cloud resources are most critical in the cloud environment based on potential impact of a misconfiguration or compromise based on querying the graph database, wherein determining which of the plurality of cloud resources are most critical comprises,
submitting one or more queries indicating a corresponding one or more graph analyses to the graph database; and
determining that a first cloud resource of the plurality of cloud resources is most critical in the cloud environment based on potential impact of a misconfiguration or compromise of the first cloud resource based on results of the one or more queries, wherein the results indicate the first cloud resource and a score of a vertex of the graph database corresponding to the first cloud resource; and
indicating that the first cloud resource is most critical in the cloud environment based on potential impact of a misconfiguration or compromise of the first cloud resource.

2. The computer-implemented method of claim 1, wherein determining the relationships among the plurality of cloud resources comprises utilizing a service of a cloud service provider which offers the cloud environment.

3. The computer-implemented method of claim 1, wherein determining the relationships among the plurality of cloud resources comprises obtaining configuration data of at least a subset of the plurality of cloud resources and determining the relationships based on the configuration data.

4. The computer-implemented method of claim 1, wherein generating the graph database comprises,
inserting data of each of the plurality of cloud resources into a graph database to create a plurality of vertices stored in the graph database; and
for each of the relationships and corresponding ones of the plurality of cloud resources indicated in the relationship, inserting an indication of the relationship into the graph database to create an edge between those of the plurality of vertices which indicate the corresponding cloud resources.

5. The computer-implemented method of claim 1 further comprising performing PageRank centrality analysis of the graph representation,
wherein the one or more graph analyses comprise PageRank centrality analysis,
wherein the score indicated in the results comprises a PageRank centrality score of the vertex of the graph database which corresponds to the first cloud resource, and
wherein determining that the first cloud resource is most critical in the cloud environment based on potential impact of a misconfiguration or compromise is critical comprises determining that the vertex corresponding to the first cloud resource has a greatest PageRank centrality score within the graph database.

6. The computer-implemented method of claim 1 further comprising,
subscribing to a data stream to which a provider of the cloud environment publishes data of new or deleted cloud resources; and
obtaining over the data stream at least one of data indicating a cloud resource created in the cloud environment or data indicating a cloud resource deleted from the cloud environment.

7. The computer-implemented method of claim 6 further comprising,
based on obtaining data over the data stream indicating a cloud resource created in the cloud environment, determining relationships between the created cloud resource and the plurality of cloud resources and updating the graph database by inserting the data of the created cloud resource and the determined relationships, wherein the updating of the graph database updates the graph representation to also indicate the created cloud resource and the determined relationships; and
based on obtaining data over the data stream indicating a cloud resource deleted from the cloud environment, deleting a vertex of the graph database which indicates the deleted cloud resource.

8. One or more non-transitory machine-readable media comprising program code to:
determine relationships among a plurality of cloud resources of a cloud environment associated with a cloud account, wherein each of the relationships is between a pair of the plurality of cloud resources;
generate a graph database comprising a plurality of vertices storing data of the plurality of cloud resources and a plurality of edges which indicate the relationships between the pairs of the plurality of cloud resources;
based on submission of a query indicating a graph analysis, determine which of the plurality of cloud resources are most critical in the cloud environment based on potential impact on others of the plurality of cloud resources if misconfigured or compromised based on results of performing the graph analysis for the graph database,
wherein the results indicate one or more of the plurality of cloud resources and one or more scores of those of the plurality of vertices corresponding to the one or more cloud resources;
determine, based on the results of performing the graph analysis, that the one or more of the plurality of cloud resources are most critical in the cloud environment based on potential impact on others of the plurality of cloud resources if misconfigured or compromised; and
indicate the one or more cloud resources as being most critical to the cloud environment for investigation and remediation of misconfigurations or compromises.

9. The non-transitory machine-readable media of claim 8, wherein the graph analysis comprises PageRank centrality analysis and the results indicate a set of scores resulting from the PageRank centrality analysis,
wherein the program code to determine which of the plurality of cloud resources are most critical in the cloud environment comprises program code to determine the one or more of the plurality of cloud resources corresponding to those the plurality of vertices having highest ones of the set of scores resulting from the PageRank centrality analysis.

10. An apparatus comprising:
a processor; and
a non-transitory machine-readable medium having instructions stored thereon that are executable by the processor to cause the apparatus to,
based on identification of a plurality of cloud resources associated with a cloud environment, determine relationships among the plurality of cloud resources;
generate a graph database from data of the plurality of cloud resources and the relationships among the plurality of cloud resources, wherein the graph database stores a graph representation of the plurality of cloud resources and the relationships;

determine with the graph database which of the plurality of cloud resources are most critical in the cloud environment based on potential impact of a misconfiguration or compromise, wherein the instructions to determine which of the plurality of cloud resources are most critical comprise instructions to,
submit one or more queries indicating a corresponding one or more graph analyses to the graph database; and
based on obtaining results of the one or more queries submitted to the graph database that indicate a first cloud resource of the plurality of cloud resources and a score of a vertex of the graph database corresponding to the first cloud resource, determine that the first cloud resource is the most critical in the cloud environment based on potential impact of a misconfiguration or compromise of the first cloud resource on atoll others of the plurality of cloud resources; and
indicate that misconfigurations or compromises affecting the first cloud resource are most critical to the others of the plurality of cloud resources in the cloud environment.

11. The apparatus of claim 10, wherein the instructions executable by the processor to cause the apparatus to determine relationships among the plurality of cloud resources comprise at least one of instructions executable by the processor to cause the apparatus to utilize a service of a cloud service provider which offers the cloud environment and instructions executable by the processor to cause the apparatus to obtain, from the cloud service provider, configuration data for at least a subset of the plurality of cloud resources and determine the relationships based on the configuration data.

12. The apparatus of claim 10, wherein the instructions executable by the processor to cause the apparatus to generate the graph database comprise instructions executable by the processor to cause the apparatus to,
insert data of each of the plurality of cloud resources into the graph database to create a plurality of vertices stored in the graph database; and
for each of the relationships and corresponding ones of the plurality of cloud resources, insert an indication of the relationship into the graph database to create an edge between those of the plurality of vertices which indicate the corresponding cloud resources.

13. The apparatus of claim 10 further comprising instructions executable by the processor to cause the apparatus to perform PageRank centrality analysis of the graph representation,
wherein the one or more graph analyses comprise PageRank centrality analysis,
wherein the score of the vertex of the graph database corresponding to the first cloud resource is a PageRank centrality score of the vertex of the graph database which corresponds to the first cloud resource, and
wherein the instructions executable by the processor to cause the apparatus to determine that the first cloud resource is most critical comprise instructions executable by the processor to cause the apparatus to determine that the PageRank centrality score is the greatest computed for the graph database.

14. The apparatus of claim 10 further comprising instructions executable by the processor to cause the apparatus to:
subscribe to a data stream to which a provider of the cloud environment publishes data of new or deleted cloud resources;
based on obtaining data over the data stream indicating a cloud resource created in the cloud environment, determine relationships between the created cloud resource and the plurality of cloud resources and insert the data of the created cloud resource and the determined relationships into the graph database; and
based on obtaining data over the data stream indicating a cloud resource deleted from the cloud environment, delete a vertex of the graph database which indicates the deleted cloud resource.

15. The method of claim 1, wherein indicating that the first cloud resource is most critical in the cloud environment based on potential impact of a misconfiguration or compromise of the first cloud resource comprises indicating that the first cloud resource is most critical for investigation and remediation of misconfigurations or compromises.

16. The method of claim 5 further comprising:
based on detecting a misconfiguration or compromise that affects a second cloud resource of the plurality of cloud resources, determining if a PageRank centrality score of a vertex of the graph database that corresponds to the second cloud resource satisfies a threshold; and
based on determining that the PageRank centrality score corresponding to the second cloud resource satisfies the threshold, indicating that the misconfiguration or compromise is critical to the cloud environment.

17. The non-transitory machine-readable media of claim 8, wherein the program code to determine relationships among the plurality of cloud resources comprises at least one of program code to utilize a service of a cloud service provider which offers the cloud environment and program code to obtain, from the cloud service provider, configuration data for at least a subset of the plurality of cloud resources and determine the relationships based on the configuration data.

18. The non-transitory machine-readable media of claim 8 further comprising program code to:
subscribe to a data stream to which a provider of the cloud environment publishes data of new or deleted cloud resources;
obtain over the data stream at least one of data indicating a cloud resource created in the cloud environment or data indicating a cloud resource deleted from the cloud environment; and
update the graph database based on the at least one of the data indicating the cloud resource created in the cloud environment and the data indicating the cloud resource deleted from the cloud environment.

19. The non-transitory machine-readable media of claim 18, wherein the program code to update the graph database comprises program code to,
based on obtained data over the data stream indicating a cloud resource created in the cloud environment, determine relationships between the created cloud resource and the plurality of cloud resources and update the graph database by inserting the data of the created cloud resource and the determined relationships; and
based on obtained data over the data stream indicating a cloud resource deleted from the cloud environment, delete a vertex of the graph database which indicates the deleted cloud resource.

20. The apparatus of claim 10, wherein the instructions executable by the processor to cause the apparatus to indicate that misconfigurations or compromises affecting the first cloud resource are most critical to the others of the plurality of cloud resources in the cloud environment comprises instructions executable by the processor to cause the apparatus to indicate that the first cloud resource is most critical for investigation and remediation of incidents.

* * * * *